United States Patent
Smith et al.

(10) Patent No.: US 9,722,665 B2
(45) Date of Patent: Aug. 1, 2017

(54) COMMUNICATION NODES AND SENSOR DEVICES CONFIGURED TO USE POWER LINE COMMUNICATION SIGNALS, AND RELATED METHODS OF OPERATION

(71) Applicant: Duke Energy Corporation, Charlotte, NC (US)

(72) Inventors: Raiford Smith, Charlotte, NC (US); Stuart Laval, Fort Mill, SC (US); Jason Handley, Waxhaw, NC (US)

(73) Assignee: DUKE ENERGY CORPORATION, Charlotte, NC (US)

( * ) Notice: Subject to any disclaimer, the term of this patent is extended or adjusted under 35 U.S.C. 154(b) by 144 days.

(21) Appl. No.: 14/270,914

(22) Filed: May 6, 2014

(65) Prior Publication Data
US 2015/0180282 A1    Jun. 25, 2015

Related U.S. Application Data

(60) Provisional application No. 61/919,993, filed on Dec. 23, 2013.

(51) Int. Cl.
*G08C 19/16*    (2006.01)
*H04B 3/54*    (2006.01)
(Continued)

(52) U.S. Cl.
CPC ............... *H04B 3/54* (2013.01); *H04Q 9/00* (2013.01); *H04J 13/00* (2013.01); *H04L 25/026* (2013.01);
(Continued)

(58) Field of Classification Search
CPC .. H02J 13/00; H04B 3/54; H04Q 9/00; H04Q 2209/30; H04L 25/0272; H04L 25/026
(Continued)

(56) References Cited

U.S. PATENT DOCUMENTS 4,689,752 A    8/1987  Fernandes et al.
5,341,372 A    8/1994  Kirkham
(Continued)

FOREIGN PATENT DOCUMENTS

WO    WO 2011076242 A1    6/2011

OTHER PUBLICATIONS

Huang et al., "A Study of Publish/Subscribe Systems for Real-Time Grid Monitoring", Parallel and Distributed Processing Symposium, Mar. 26-30, 2007, IPDPS 2007, pp. 1-8.
(Continued)

*Primary Examiner* — Zhen Y Wu
(74) *Attorney, Agent, or Firm* — Myers Bigel, P.A.

(57) ABSTRACT

Methods of operating a communication node are provided. A method of operating a communication node may include transmitting a first power line communication signal from the communication node to a sensor device that is at or adjacent an electric grid device. The method may include receiving from the sensor device a second power line communication signal that is responsive to the first power line communication signal, at the communication node. Moreover, the method may include determining a distance between the communication node and the electric grid device by measuring an electrical parameter of the second power line communication signal, at the communication node. Related communication nodes are also described.

18 Claims, 21 Drawing Sheets

(51) Int. Cl.
*H04Q 9/00* (2006.01)
*H04L 25/02* (2006.01)
*H04J 13/00* (2011.01)

(52) U.S. Cl.
CPC ...... *H04L 25/0272* (2013.01); *H04Q 2209/30* (2013.01)

(58) Field of Classification Search
USPC ...................................................... 340/870.1
See application file for complete search history.

(56) References Cited

U.S. PATENT DOCUMENTS

| | | | |
|---|---|---|---|
| 5,495,239 A | 2/1996 | Ouellette | |
| 6,327,541 B1 | 12/2001 | Pitchford et al. | |
| 6,509,841 B1 | 1/2003 | Colton et al. | |
| 7,117,105 B2 | 10/2006 | Premerlani et al. | |
| 7,126,494 B2 | 10/2006 | Ardalan et al. | |
| 7,251,570 B2 | 7/2007 | Hancock et al. | |
| 7,415,725 B2 | 8/2008 | Henneberry et al. | |
| 7,558,703 B2 | 7/2009 | Stoupis et al. | |
| 7,764,943 B2 | 7/2010 | Radtke | |
| 7,945,401 B2 | 5/2011 | Bowdry et al. | |
| 8,135,550 B2 | 3/2012 | Bose et al. | |
| 8,198,998 B1* | 6/2012 | Propp | H02J 13/0024 340/538 |
| 2003/0079613 A1* | 5/2003 | Williamson | A47J 31/52 99/282 |
| 2005/0172056 A1* | 8/2005 | Ahn | H04L 12/2803 710/72 |
| 2008/0052253 A1 | 2/2008 | Edwards et al. | |
| 2008/0070504 A1* | 3/2008 | Benkert | H04W 8/005 455/41.2 |
| 2008/0258903 A1* | 10/2008 | Le | G08B 13/19602 340/506 |
| 2008/0260010 A1 | 10/2008 | Schwager et al. | |
| 2009/0002137 A1* | 1/2009 | Radtke | G05B 13/021 375/258 |
| 2009/0281674 A1 | 11/2009 | Taft | |
| 2010/0299517 A1* | 11/2010 | Jukic | H04L 63/0823 713/150 |
| 2012/0029710 A1 | 2/2012 | Dodderi et al. | |
| 2012/0054397 A1 | 3/2012 | Melvin, Jr. et al. | |
| 2012/0119577 A1* | 5/2012 | Clarke | H02J 3/14 307/40 |
| 2012/0166610 A1 | 6/2012 | Doh et al. | |
| 2012/0184279 A1* | 7/2012 | Marti | H04L 12/2838 455/446 |
| 2012/0217803 A1 | 8/2012 | Talkin et al. | |
| 2012/0265586 A1* | 10/2012 | Mammone | G06Q 50/06 705/14.1 |
| 2012/0300860 A1 | 11/2012 | Washiro | |
| 2013/0024149 A1 | 1/2013 | Nayar et al. | |
| 2013/0110296 A1 | 5/2013 | Khoo et al. | |
| 2013/0154667 A1* | 6/2013 | Scheu | G01B 7/02 324/617 |
| 2014/0146899 A1 | 5/2014 | Hallas | |
| 2014/0191582 A1* | 7/2014 | Deboy | H02J 3/383 307/82 |
| 2014/0210449 A1 | 7/2014 | Ichikawa et al. | |
| 2014/0269860 A1* | 9/2014 | Brown | H04B 3/54 375/219 |
| 2015/0016159 A1* | 1/2015 | Deboy | H02J 3/383 363/71 |
| 2015/0036685 A1* | 2/2015 | Wijnands | H04L 45/507 370/390 |

OTHER PUBLICATIONS

Abelsen et al., "Adaptive Information Flow Mechanisms and Management for Power Grid Contingencies", Washington State University School of Electrical Engineering and Computer Science, Pullman, Washington, USA, 2007.

\* cited by examiner

COMMUNICATION NODES AND SENSOR DEVICES CONFIGURED TO USE POWER LINE COMMUNICATION SIGNALS, AND RELATED METHODS OF OPERATION

RELATED APPLICATIONS

The present application claims the benefit of and priority to U.S. Provisional Patent Application Ser. No. 61/919,993, filed on Dec. 23, 2013, entitled Communication Nodes and Sensor Devices Configured to Use Power Line Communication Signals, and Related Methods of Operation, the disclosure of which is hereby incorporated herein in its entirety by reference. Moreover, the present application is related to U.S. patent application Ser. No. 14/264,757, filed on Apr. 29, 2014, entitled Methods of Processing Data Corresponding to a Device that Corresponds to a Gas, Water, or Electric Grid, and Related Devices and Computer Program Products, the disclosure of which is hereby incorporated herein in its entirety by reference.

FIELD

The present disclosure relates to utility grids.

BACKGROUND

An electric grid may include various electric grid devices, which may be intelligent, interconnected equipment that deliver, monitor, measure, and/or control the flow of electricity in a power delivery system. The electric grid may also include a telecommunications infrastructure for transporting and delivering information regarding the electric grid, as well as analytics, architecture, and data-management tools for managing/optimizing the electric grid. Moreover, a wide variety of electric grid customer-owned assets, which may consume, store, or produce electricity, may be connected to the electric grid.

As an electric grid, and various interconnected customer-owned devices and electric grid devices in the electric grid, become more complex, it may be more difficult to meet electric utility customers' demands regarding response times, costs, safety, and reliability. For example, an electric grid may reach diverse geographies, customers, and vendor technologies. Accordingly, processing data and managing electric grid devices may be costly and time-consuming.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present inventive concepts.

Various embodiments of the present inventive concepts include a method of operating a communication node. The method may include transmitting a first power line communication signal from the communication node to a sensor device that is at or adjacent an electric grid device. The method may include receiving from the sensor device a second power line communication signal that is responsive to the first power line communication signal, at the communication node. Moreover, the method may include determining a distance between the communication node and the electric grid device by measuring an electrical parameter of the second power line communication signal, at the communication node.

According to various embodiments, transmitting the first power line communication signal may include transmitting the first power line communication signal using a Mid Voltage (MV) electric distribution network corresponding to voltages between about 4,000 Volts and about 69,000 Volts. Moreover, receiving the second power line communication signal may include receiving the second power line communication signal using the Mid Voltage (MV) electric distribution network corresponding to voltages between about 4,000 Volts and about 69,000 Volts. In some embodiments, the first power line communication signal may include a Power Line Carrier (PLC) signal or a Broadband over Power Lines (BPL) signal.

In various embodiments, the method may include transmitting, from the communication node to an electric utility head end system or a higher-tier communication node, a value representing the distance, via a local area network or a Wide Area Network (e.g., a cellular network, Ethernet, or a fiber network). Additionally or alternatively, determining the distance between the communication node and the electric grid device by measuring the electrical parameter of second power line communication signal at the communication node may include determining the distance between the communication node and the electric grid device by measuring an impedance corresponding to the second power line communication signal, at the communication node.

According to various embodiments, the method may include determining a device type of the electric grid device by analyzing an identification component (e.g., a frequency identification component or another identification component) of the second power line communication signal, at the communication node. Additionally or alternatively, the method may include determining whether the electric grid device is electrically connected to an electric grid, by analyzing an identification component of the second power line communication signal, at the communication node. Moreover, in some embodiments, the method may include monitoring a health component of the electric grid device by analyzing an electrical signature and/or an electrical parameter of the second power line communication signal, at the communication node.

In various embodiments, the sensor device may be a first sensor device, and the electric grid device may be a first electric grid device. Moreover, transmitting the first power line communication signal may include transmitting an unsolicited ping from the communication node to the first sensor device and to a second sensor device that is at or adjacent a second electric grid device. In some embodiments, the distance may be a first distance, and the electrical parameter may be a first electrical parameter. Moreover, the method may include receiving from the second sensor device a third power line communication signal that is responsive to the unsolicited ping, at the communication node, and determining a second distance between the communication node and the second electric grid device by measuring a second electrical parameter of the third power line communication signal, at the communication node.

A communication node, according to various embodiments, may include a power line communications interface configured to transmit a first power line communication signal from the communication node to a sensor device that is at or adjacent an electric grid device, and to receive from the sensor device a second power line communication signal that is responsive to the first power line communication signal. Moreover, the communication node may include a processor configured to determine a distance between the communication node and the electric grid device by measuring an electrical parameter of the second power line communication signal at the communication node. In some embodiments, the communication node may include a polling device that includes at least one of the power line communications interface and the processor.

According to various embodiments, the power line communications interface may be configured to transmit the first power line communication signal using a Mid Voltage (MV) electric distribution network corresponding to voltages between about 4,000 Volts and about 69,000 Volts, and to receive the second power line communication signal using the Mid Voltage (MV) electric distribution network corresponding to voltages between about 4,000 Volts and about 69,000 Volts. In some embodiments, the first power line communication signal may include a Power Line Carrier (PLC) signal or a Broadband over Power Lines (BPL) signal.

In various embodiments, the communication node may include a network interface configured to transmit, from the communication node to an electric utility head end system, a value representing the distance, via a local area network or a Wide Area Network (e.g., a cellular network, Ethernet, or a fiber network). In some embodiments, the electrical parameter may be an impedance, and the processor may be configured to determine the distance between the communication node and the electric grid device by using the impedance of the second power line communication signal.

According to various embodiments, the processor may be configured to determine a device type of the electric grid device by analyzing an identification component of the second power line communication signal. Additionally or alternatively, the processor may be configured to determine whether the electric grid device is electrically connected to an electric grid, by analyzing an identification component of the second power line communication signal. Moreover, in some embodiments, the processor may be configured to monitor a health component of the electric grid device by analyzing an electrical signature and/or an electrical parameter of the second power line communication signal.

In various embodiments, the sensor device may be a first sensor device, and the electric grid device may be a first electric grid device. Moreover, the power line communications interface may be configured to transmit the first power line communication signal as an unsolicited ping to the first sensor device and to a second sensor device that is at or adjacent a second electric grid device. In some embodiments, the distance may be a first distance, the electrical parameter may be a first electrical parameter, the power line communications interface may be configured to receive from the second sensor device a third power line communication signal that is responsive to the unsolicited ping, and the processor may be configured to determine a second distance between the communication node and the second electric grid device by measuring a second electrical parameter of the third power line communication signal.

A method of operating a sensor device that is at or adjacent an electric grid device, according to various embodiments, may include receiving from a communication node a first power line communication signal at the sensor device that is at or adjacent the electric grid device. The method may include transmitting a second power line communication signal from the sensor device to the communication node, in response to receiving the first power line communication signal. Moreover, the second power line communication signal may include an electrical parameter corresponding to a distance between the communication node and the electric grid device.

According to various embodiments, receiving the first power line communication signal may include receiving the first power line communication signal using a Mid Voltage (MV) electric distribution network corresponding to voltages between about 4,000 Volts and about 69,000 Volts. Moreover, transmitting the second power line communication signal may include transmitting the second power line communication signal using the Mid Voltage (MV) electric distribution network corresponding to voltages between about 4,000 Volts and about 69,000 Volts. In some embodiments, the first power line communication signal may include a Power Line Carrier (PLC) signal or a Broadband over Power Lines (BPL) signal.

In various embodiments, the electrical parameter corresponding to a distance between the communication node and the electric grid device may be an impedance corresponding to the second power line communication signal. Moreover, the second power line communication signal may include an identification component corresponding to a device type of the electric grid device, and transmitting the second power line communication signal may include transmitting the second power line communication signal including the identification component corresponding to the device type of the electric grid device, from the sensor device to the communication node, in response to receiving the first power line communication signal.

According to various embodiments, the second power line communication signal may include an identification component corresponding to whether the electric grid device is electrically connected to an electric grid. Moreover, transmitting the second power line communication signal may include transmitting the second power line communication signal including the identification component corresponding to whether the electric grid device is electrically connected to the electric grid, from the sensor device to the communication node, in response to receiving the first power line communication signal. Additionally or alternatively, the second power line communication signal may include an electrical signature and/or an electrical parameter corresponding to a health component of the electric grid device, and transmitting the second power line communication signal may include transmitting the second power line communication signal including the electrical signature and/or electrical parameter corresponding to the health component of the electric grid device, from the sensor device to the communication node, in response to receiving the first power line communication signal. Moreover, in some embodiments, the first power line communication signal may include an unsolicited ping transmitted by the communication node, and receiving the first power line communication signal may include receiving from the communication node the unsolicited ping at the sensor device that is at or adjacent the electric grid device.

A sensor device at or adjacent an electric grid device, according to various embodiments, may include a power line communications interface configured to receive a first power line communication signal from a communication node. Moreover, the power line communications interface of the sensor device may be configured to transmit, from the sensor device to the communication node, a second power line communication signal that is responsive to the first power line communication signal. The second power line communication signal may include an electrical parameter corresponding to a distance between the communication node and the electric grid device.

According to various embodiments, the power line communications interface may be configured to receive the first power line communication signal using a Mid Voltage (MV) electric distribution network corresponding to voltages between about 4,000 Volts and about 69,000 Volts, and to transmit the second power line communication signal using the Mid Voltage (MV) electric distribution network corresponding to voltages between about 4,000 Volts and about 69,000 Volts. In some embodiments, the first power line communication signal may be a Power Line Carrier (PLC) signal or a Broadband over Power Lines (BPL) signal.

In various embodiments, the electrical parameter corresponding to the distance between the communication node and the electric grid device may include an impedance corresponding to the second power line communication signal. Additionally or alternatively, the second power line communication signal may include an identification component corresponding to a device type of the electric grid device, and the power line communications interface may be configured to transmit, from the sensor device to the communication node, the second power line communication signal including the identification component corresponding to the device type of the electric grid device, in response to receiving the first power line communication signal.

According to various embodiments, the second power line communication signal may include an identification component corresponding to whether the electric grid device is electrically connected to an electric grid, and the power line communications interface may be configured to transmit from the sensor device to the communication node, the second power line communication signal including the identification component corresponding to whether the electric grid device is electrically connected to the electric grid, in response to receiving the first power line communication signal. Additionally or alternatively, the second power line communication signal may include an electrical signature and/or an electrical parameter corresponding to a health component of the electric grid device, and the power line communications interface may be configured to transmit from the sensor device to the communication node, the second power line communication signal including the electrical signature and/or electrical parameter corresponding to the health component of the electric grid device, in response to receiving the first power line communication signal. Moreover, in some embodiments, the first power line communication signal may be an unsolicited ping transmitted by the communication node, and the power line communications interface may be configured to receive from the communication node the unsolicited ping at the sensor device that is at or adjacent the electric grid device.

It is noted that aspects of the present inventive concepts described with respect to one embodiment may be incorporated in a different embodiment although not specifically described relative thereto. That is, all embodiments and/or features of any embodiment can be combined in any way and/or combination. Applicants reserve the right to change any originally filed claim or file any new claim accordingly, including the right to be able to amend any originally filed claim to depend from and/or incorporate any feature of any other claim although not originally claimed in that manner. These and other objects and/or aspects of the present inventive concepts are explained in detail below.

BRIEF DESCRIPTION OF THE DRAWINGS

The accompanying drawings, which form a part of the specification, illustrate various embodiments of the present inventive concepts. The drawings and description together serve to fully explain embodiments of the present inventive concepts.

DETAILED DESCRIPTION

Figure 1A:
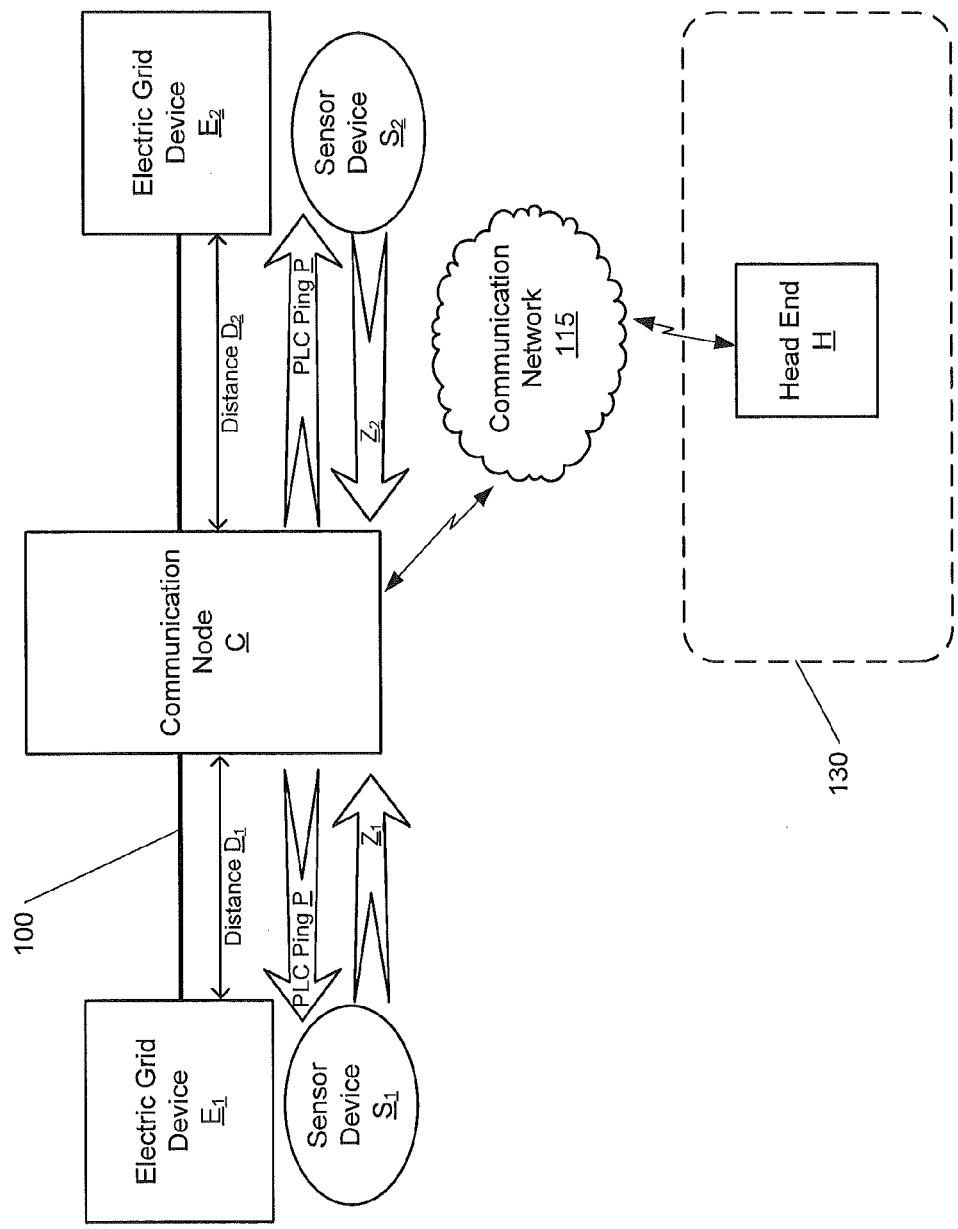
FIG. 1A is a schematic illustration of a communication node in communication with at least one sensor device, according to various embodiments.

Specific example embodiments of the present inventive concepts now will be described with reference to the accompanying drawings. The present inventive concepts may, however, be embodied in a variety of different forms and should not be construed as limited to the embodiments set forth herein. Rather, these embodiments are provided so that this disclosure will be thorough and complete and will fully convey the scope of the present inventive concepts to those skilled in the art. In the drawings, like designations refer to like elements. It will be understood that when an element is referred to as being "connected," "coupled," or "responsive" to another element, it can be directly connected, coupled or responsive to the other element or intervening elements may be present. Furthermore, "connected," "coupled," or "responsive" as used herein may include wirelessly connected, coupled, or responsive.

The terminology used herein is for the purpose of describing particular embodiments only and is not intended to be limiting of the present inventive concepts. As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. The symbol "/" is also used as a shorthand notation for "and/or."

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will also be understood that although the terms "first" and "second" may be used herein to describe various elements, these elements should not be limited by these terms. These terms are only used to distinguish one element from another element. Thus, a first element could be termed a second element, and similarly, a second element may be termed a first element without departing from the teachings of the present inventive concepts.

Example embodiments of the present inventive concepts may be embodied as nodes, devices, and methods. Accordingly, example embodiments of the present inventive concepts may be embodied in hardware and/or in software (including firmware, resident software, micro-code, etc.). Furthermore, example embodiments of the present inventive concepts may take the form of a computer program product comprising a non-transitory computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Example embodiments of the present inventive concepts are described herein with reference to flowchart and/or block diagram illustrations. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the functions specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

As an electric grid becomes more complex, it may be more costly and difficult to determine what assets (e.g., electric grid devices) are electrically interconnected on the electric grid, as well as to determine the health of such assets. Various embodiments described herein, however, may improve the situational awareness and health of assets. For example, various embodiments described herein may determine an asset's identification, distance, health, and/or connectivity on an electric grid. As an example, a Mid Voltage (MV) sonar technology may be used with a standards-based, modular communication platform of a communications node, along with a power line communication technology, to continually determine the electrical-connectivity of grid assets. Moreover, the MV sonar technology may monitor device performance, behaviors, and indicators of aging. Accordingly, the MV sonar technology may augment an existing, centralized Geospatial/geographic Information System (GIS) by accurately identifying the location, phase, electrical connectivity, and type of asset(s) on distribution lines with near-real-time responsiveness to dynamic changes on the grid.

Further value can be generated from a MV sonar technology by extracting waveform and asset operation information from a low-cost sonar sensor to measure and monitor an asset's health signatures. Such data may be used for predictive trending analytics to improve/optimize asset management through Condition-Based Maintenance (CBM) and to reduce Mean-Time-To-Failure (MTTF). Additionally, such capabilities may also improve reliability indices, such as System Average Interruption Frequency Index (SAIFI), Customer Average Interruption Duration Index (CAIDI), etc. In addition to reliability and asset management benefits, the MV sonar technology may generate operating cost savings, and improvements in planning and engineering. For example, when MV sonar technology is seamlessly integrated with a field message bus (rather than a message bus at a utility data center) and Supervisory Control And Data Acquisition (SCADA) operational systems (e.g., Distribution Management System (DMS), Outage Management System (OMS)), these savings may be captured and quantified. Moreover, some embodiments of MV sonar technology described herein may enable control schemes that might otherwise not be feasible without such dynamic, distributed asset identification and decision-making that is closer to electric grid assets.

Referring now to FIG. 1A, a schematic illustration is provided of a communication node C in communication with at least one sensor device S. For example, the communication node C may communicate with sensor devices $S_1$, $S_2$ that are at or adjacent respective electric grid devices $E_1$, $E_2$. As an example, the communication node C may communicate with the electric grid devices $E_1$, $E_2$ using Power Line Carrier (PLC) communications.

A sensor device S may be a low-cost line device. Moreover, it will be understood that respective sensor device S may be installed next to each field asset (e.g., next to each electric grid device E). For example, one sensor device S may be installed per capacitor bank, regulator, recloser, line switch, fuse, and transformer. Each sensor device S may include a coupler (e.g., an analog waveform coupler) and may optionally include a battery. Moreover, each sensor device S may require modest/minimal or no firmware and may not include a built-in Global Positioning System (GPS). In some embodiments, a sensor device S may provide identification tags based on each asset type and based on electrical connectivity status. In some embodiments, a sensor device S may receive signals and transmit only solicited responses over power distribution lines above 4,000 Volts.

The electric grid devices $E_1$, $E_2$ may each be an element of an electric grid 100, and the communication node C may communicate with a head end system H of an electric utility data center 130 via a communication network 115. The communication network 115 may include one or more wireless or wired communication networks, such as a local area network (e.g., Ethernet or WiFi) or a Wide Area Network (e.g., a cellular network, Ethernet, or a fiber (such as fiber-optic) network). Software of the head end system H may be installed on a back-office server or microprocessor-based controller. Moreover, the software of the head end system H may aggregate and stitch together, via triangulation, each communication node C's/polling device 190's (FIG. 1E) view of impedance distance, location, and phasing of all assets of the electric grid 100. Accordingly, the software of the head end system H may generate a full map of the electric devices/circuits on the electric grid 100. In some embodiments, the software of the head end system H may use triangulation and rules (e.g., business rules) to flag and resolve location and phase conflicts, and/or may integrate with an asset management system (e.g., an asset management system 131 of FIG. 1B) for asset health performance monitoring and tracking.

Referring still to FIG. 1A, the communication node C may transmit a PLC ping signal P. The communication node C may receive respective signals from the sensor devices $S_1$, $S_2$ in response to the PLC ping signal P. The signals received from the sensor devices $S_1$, $S_2$ may have respective impedances $Z_1$, $Z_2$. The impedances $Z_1$, $Z_2$ may be used to determine respective distances $D_1$, $D_2$ between the electric grid devices $E_1$, $E_2$ and the communication node C.

Figure 1B:
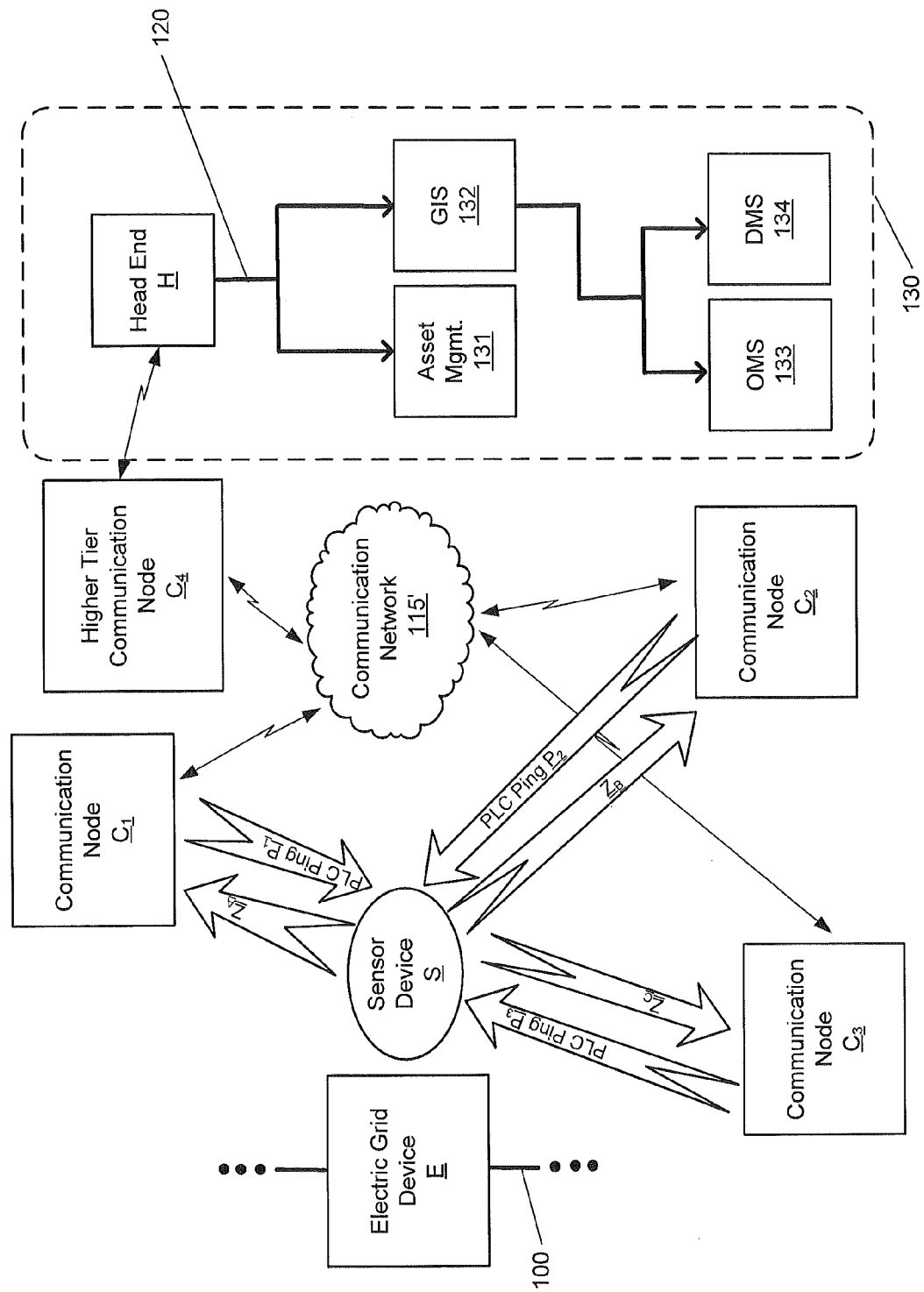
FIG. 1B is a schematic illustration of a sensor device in communication with at least one communication node, according to various embodiments.

Referring now to FIG. 1B, a schematic illustration is provided of a sensor device S in communication with at least one communication node C, according to various embodiments. For example, the sensor device S may communicate with communication nodes $C_1$-$C_3$. The sensor device S is at or adjacent a corresponding electric grid device E, and may receive PLC ping signals $P_1$-$P_3$ from the communication nodes $C_1$-$C_3$, respectively. In response, the sensor device S may transmit signals having respective impedances $Z_A$-$Z_C$. The impedances $Z_A$-$Z_C$ may be used to determine respective distances between the communication nodes $C_1$-$C_3$ and the electric grid device E. By using at least three such distance calculations, the position of the electric grid device E may be determined/triangulated. In other words, the same sensor device S may transmit signals that are received and processed at respective communication nodes C to determine respective distances D between the electric grid device E and the communication nodes C, where the multiple distances D may be used at one or more head end systems H to triangulate the location of the electric grid device E.

FIG. 1B also illustrates that the electric utility data center 130 may include a data center message bus 120, which may provide communications between a head end system H and an asset management (Asset Mgmt.) system 131 and a Geographic Information System (GIS) 132. The electric utility data center 130 may also include an Outage Management System (OMS) 133 and a Distribution Management System (DMS) 134, which may communicate with the head end system H via the data center message bus 120 or another data center message bus.

Referring still to FIG. 1B, multiple tiers of communication nodes C may be provided. For example, the communication nodes $C_1$-$C_3$ may be lowest-tier, edge communication nodes, whereas a higher-tier communication node $C_4$ may be between the communication nodes $C_1$-$C_3$ and the electric utility data center 130. In some embodiments, the higher-tier communication node $C_4$ may manage the communication nodes $C_1$-$C_3$. The higher-tier communication node $C_4$ may communicate with the communication nodes $C_1$-$C_3$ via a communication network 115', which may be one of the types of networks described with respect to the communication network 115 of FIG. 1A. Moreover, it will be understood that the higher-tier communication node $C_4$ may communicate with the electric utility data center 130 via a communication network such as the communication network 115 of FIG. 1A.

Figure 1C:
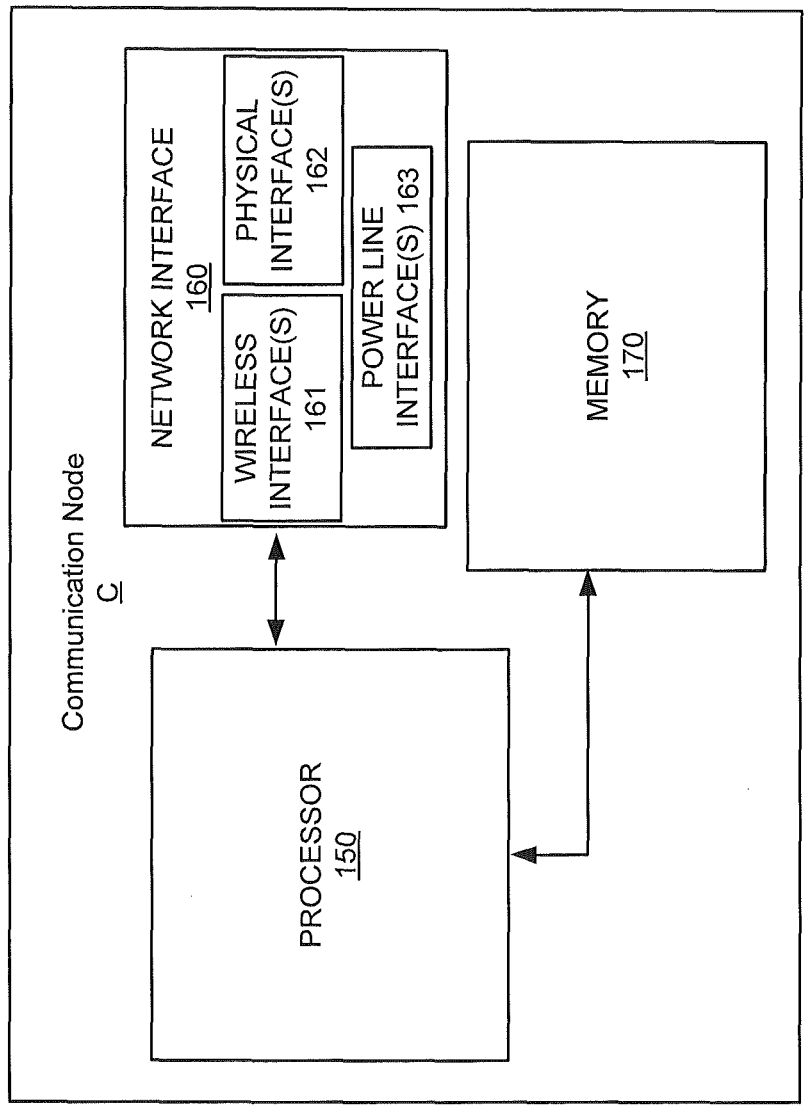
FIG. 1C is a block diagram of a communication node of FIGS. 1A and 1B, according to various embodiments.

Referring now to FIG. 1C, a block diagram is provided of a communication node C of FIGS. 1A and 1B, according to various embodiments. The communication node C may be the communication node C of FIG. 1A or one of the communication nodes $C_1$-$C_4$ of FIG. 1B, and may include a processor 150, a network interface 160, and a memory 170. The processor 150 of the communication node C may be coupled to the network interface 160. The processor 150 may be configured to communicate with sensor devices S, electric grid devices E, other communication nodes C, and/or the electric utility data center 130 via the network interface 160.

For example, the network interface 160 may include one or more wireless interfaces 161 (e.g., 3G/LTE, other cellular, WiFi, Global Positioning System (GPS) interfaces, etc.) and one or more physical interfaces 162 (e.g., Ethernet, serial, Universal Serial Bus (USB) interfaces, etc.). Moreover, the network interface 160 may optionally include one or more power line interfaces 163 (e.g., Low Voltage (LV) or Mid Voltage (MV) PLC). Accordingly, as one example, the communication node C may be configured to communicate with one or more sensor devices S via the power line interface(s) 163, and may be configured to communicate with the communication networks 115, 115' via the wireless interface(s) 161 and/or the wired/physical interface(s) 162. Additionally, the wireless interface(s) 161 may optionally include 900 MHz radio.

Referring still to FIG. 1C, the memory 170 may be coupled to the processor 150. The memory 170 may also store instructions/algorithms used by the processor 150. The communication node C may include core hardware components such as a power supply, 400 MHz or higher speed processor(s), and 256 Megabytes (MB) or more of RAM. Such modest core hardware components (in contrast with those of servers, super computers, etc.) demonstrate the considerable capabilities of a distributed intelligence smart grid system to solve complex optimization problems.

The communication node C may include core applications, such as CPU/memory/OS management applications, port/device drivers, router/Internet Protocol (IP) services, network management services, basic protocol support, SCADA, custom Application Programming Interface (API)/applications, and device security services. Moreover, the communication node C may include virtual applications, such as a virtual machine (e.g., a Java Virtual Machine), message bus(es), message broker(s), protocol adapters, mini-SCADA, open-standards API, and third-party applications (e.g., security/analytics applications). The core applications may use such software as C++/Linux, and the virtual applications may use such software as Java/Linux.

Because the communication node C of FIG. 1C is interoperable with other communication nodes C and includes a modular hardware/software platform, the use of the communication nodes C allows a smart electric grid (e.g., the grid 100 of FIGS. 1A, 1B) to be deployed gradually as economics and technology allow. For example, a communication node C can be added when a meter is added to the grid 100, or when a street light is added to the grid 100.

Figure 1D:
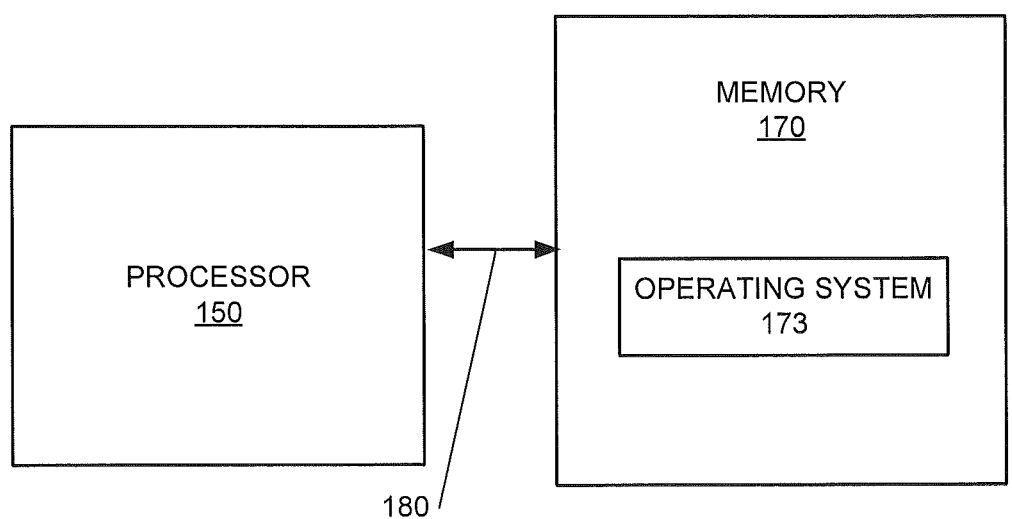
FIG. 1D is a block diagram that illustrates details of an example processor and memory that may be used in accordance with various embodiments.

Referring now to FIG. 1D, a block diagram is provided that illustrates details of an example processor 150 and memory 170 of a communication node C that may be used in accordance with various embodiments. The processor 150 communicates with the memory 170 via an address/data bus 180. The processor 150 may be, for example, a commercially available or custom microprocessor. Moreover, it will be understood that the processor may include multiple processors. The memory 170 is representative of the overall hierarchy of memory devices containing the software and data used to implement various functions of a communication node C as described herein. The memory 170 may include, but is not limited to, the following types of devices: cache, ROM, PROM, EPROM, EEPROM, flash, Static RAM (SRAM), and Dynamic RAM (DRAM).

As shown in FIG. 1D, the memory 170 may hold various categories of software and data, such as an operating system 173. The operating system 173 controls operations of a communication node C. In particular, the operating system 173 may manage the resources of the communication node C and may coordinate execution of various programs by the processor 150.

Figure 1E:
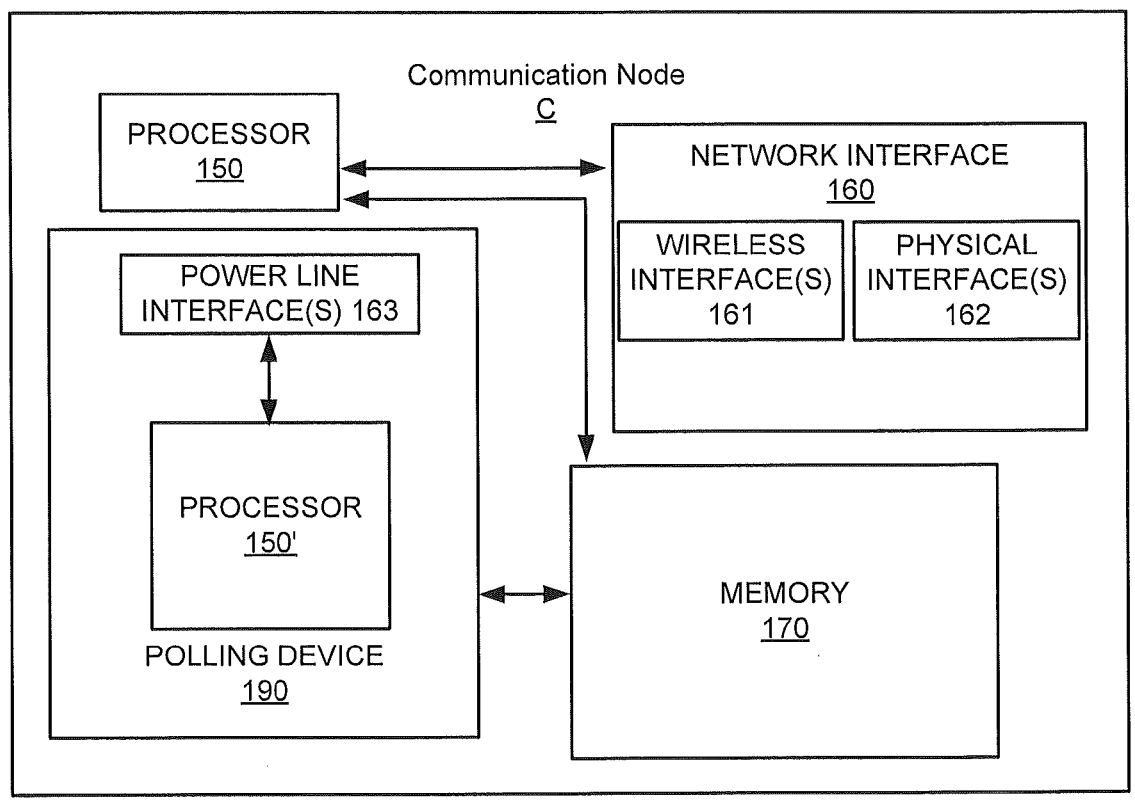
FIG. 1E is a block diagram of a communication node of FIGS. 1A and 1B that includes a polling device, according to various embodiments.

Referring now to FIG. 1E, a block diagram is provided of a communication node C of FIGS. 1A and 1B that includes a polling device 190, according to various embodiments. The polling device 190 may include the power line interface(s) 163 of FIG. 1D, a processor 150', and/or a memory. Accordingly, the polling device 190 may be added to/installed in an existing communication node C. For example, the polling device 190 may be added to/installed in an existing communication node C that otherwise lacks the power line interface(s) 163 or waveform analysis functionality.

In some embodiments, the polling device 190 may be a data collector device installed inside a communication node C. In particular the polling device 190 may be a low-cost embedded module, and may be powered by the communication node C (e.g., at 120/240 Volts). The polling device 190 may require modest/minimal firmware to allow local data access of MV sonar sensor information to other applications residing on the communication node C. Moreover, the polling device 190 may transmit unsolicited pings P to sensor devices S (e.g., MV sonar sensors) and may receive solicited messages from the sensor devices S using a power line communication technology such as Orthogonal Frequency-Division Multiplexing (OFDM)-based Power Line Carrier or Broadband over Power Line. The power line communications described herein may, in some embodiments, be long-range power line communications that can travel in excess of one mile. In some embodiments, the polling device 190 may measure an impedance Z to determine a distance from an asset (e.g., an electric grid device E).

Moreover, the polling device 190 may use a GPS inside a communication node C to determine a geo-spatial location of the communication node C, which can be used with a value of distance D to determine the location of an electric grid device E. In some embodiments, the polling device 190 may include an integrated Analog-to-Digital (A/D) converter to measure and record waveform signatures (e.g., current, voltage, etc.). In some embodiments, the polling device 190 may use/include rules (e.g., business rules) to configure ping P frequencies to occur (a) during regular intervals, (b) after asset operation, or (c) in the event of a power failure/outage. Moreover, the polling device 190 may include one or more object models that are compatible with a field message bus and can be mapped to SCADA operational systems.

Figure 1F:
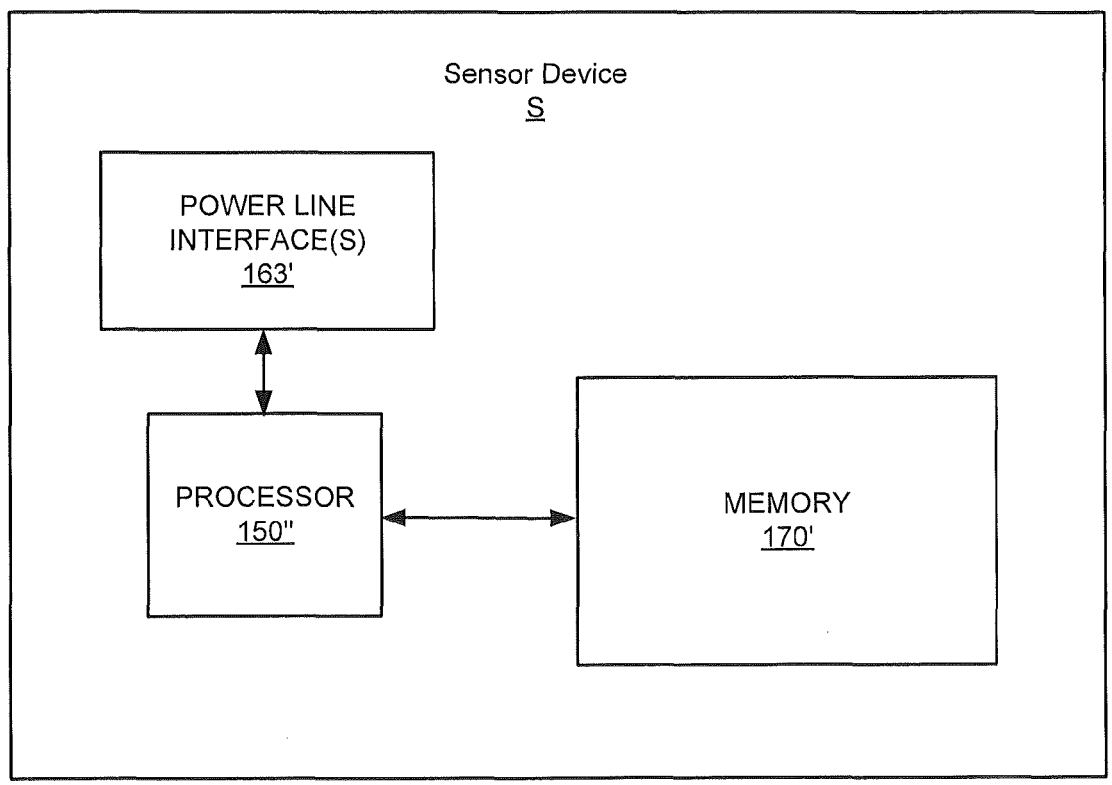
FIG. 1F is a block diagram of a sensor device of FIGS. 1A and 1B, according to various embodiments.

Referring now to FIG. 1F, a block diagram is provided of a sensor device S of FIGS. 1A and 1B, according to various embodiments. The sensor device S may include a processor 150", one or more power line interfaces 163', and a memory 170'. The power line interface(s) 163' of the sensor device S may be configured to receive power line communication signals (e.g., PLC pings P) from communication nodes C and to transmit responsive power line communication signals to the communication nodes C, using the processor 150".

Referring again to FIGS. 1A and 1B, an electric grid device E may be, for example, an electric utility meter, a transformer, a light (e.g., a street light), an electric grid control device, an electric grid protection device, a recloser, a line sensor, a weather sensor, an Advanced Metering Infrastructure (AMI) device, an analog or digital sensor connected to an electric utility asset, an electric generator, an electric turbine, an electric boiler, an electric vehicle, a home appliance, a battery storage device, a capacitor device, a solar power device, a smart generation device, an intelligent switching device, an emission monitoring device, or a voltage regulator. It will be understood that an electric grid device E described herein shall refer to any one of the electric grid devices $E_1$, $E_2$ described herein. Moreover, it will be understood that more than two electric grid devices E may be included in an electric grid 100. For example, dozens, hundreds, thousands, or more electric grid devices E may be included in the electric grid 100.

Similarly, a communication node C shall refer to any one of the communication nodes $C_1$-$C_4$ described herein, and dozens, hundreds, thousands, or more communication nodes C may be included. Moreover, a sensor device S shall refer to any one of the sensor devices $S_1$, $S_2$ described herein, and dozens, hundreds, thousands, or more sensor devices S may be included at or adjacent corresponding electric grid devices E. It will be understood that a sensor device S that is at an electric grid device E may be inside the electric grid device E or may be on the outside of the electric grid device E. Moreover, a sensor device S that is adjacent an electric grid device E may be spaced apart from the electric grid device E, but close enough to the electric grid device E to represent the position of the electric grid device E on the electric grid 100. Additionally, it will be understood that more than one head end system H may be included.

Figure 2A:
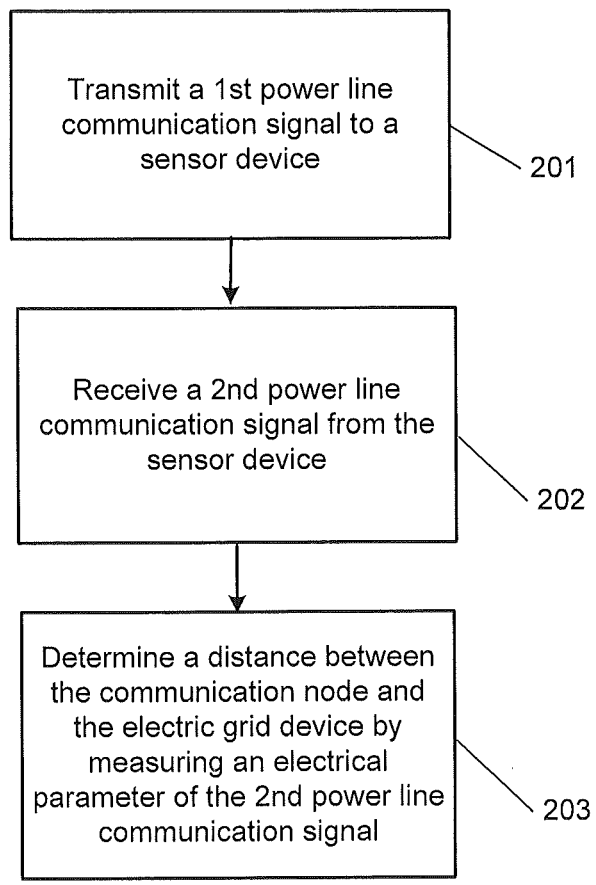
FIGS. 2A-2H are flowcharts illustrating operations of a communication node of FIGS. 1A-1E, according to various embodiments.

Referring now to FIGS. 2A-2H, flowcharts are provided illustrating operations of a communication node C of FIGS. 1A-1E, according to various embodiments. Referring to FIG. 2A, operations of the communication node C may include transmitting (Block 201) a first power line communication signal P from the communication node C to a sensor device S that is at or adjacent an electric grid device E. The operations may include receiving (Block 202) from the sensor device S a second power line communication signal that is responsive to the first power line communication signal P, at the communication node C. Moreover, the operations may include determining (Block 203) a distance D between the communication node C and the electric grid device E by measuring an electrical parameter of the second power line communication signal, at the communication node C.

In some embodiments, the communication node C may measure the full waveform, rather than just the magnitude, of the second power line communication signal that is received from the sensor device S. For example, a power line carrier data collector in the communication node C may sample the full waveform of the second power line communication signal.

Figure 2B:
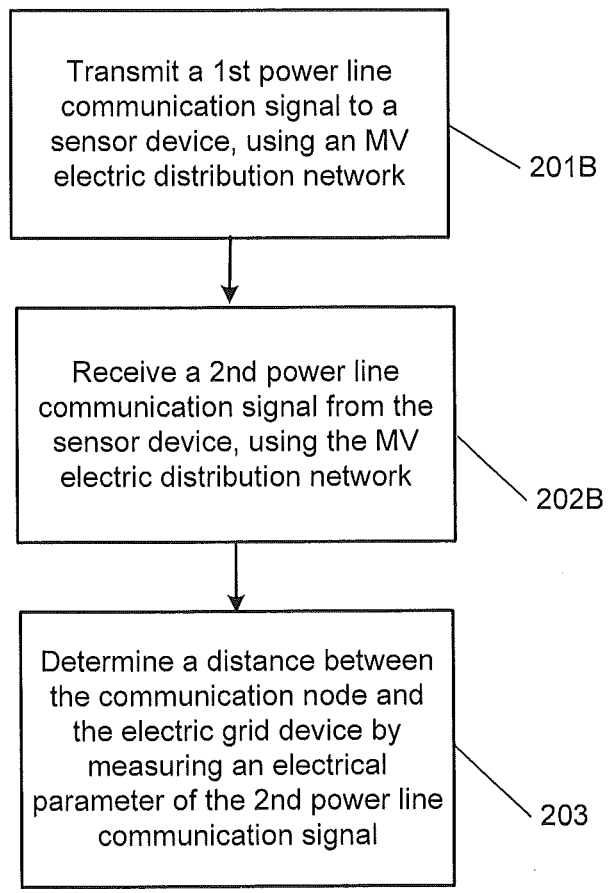

Referring to FIG. 2B, operations of transmitting (Block 201) the first power line communication signal P may include transmitting (Block 201B) the first power line communication signal P using a Mid Voltage (MV) electric distribution network corresponding to voltages between about 4,000 Volts and about 69,000 Volts. Moreover, operations of receiving (Block 202) the second power line communication signal may include receiving (Block 202B) the second power line communication signal using the Mid Voltage (MV) electric distribution network corresponding to voltages between about 4,000 Volts and about 69,000 Volts.

Figure 2C:
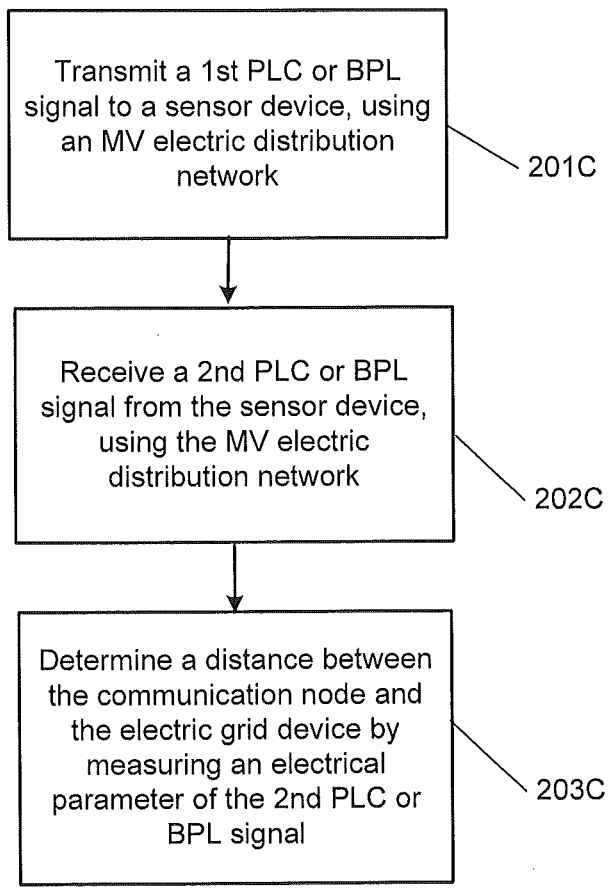

Referring to FIG. 2C, it will be understood that the first power line communication signal P may be a Power Line Carrier (PLC) signal or a Broadband over Power Lines (BPL) signal (Block 201C), Accordingly, the PLC pings P illustrated in FIGS. 1A and 1B may alternatively be BPL pings. Moreover, referring again to FIG. 2C, which is a modification of FIG. 2B, the second power line communication signal may be a PLC signal or a BPL signal (Blocks 202C, 203C).

Figure 2D:
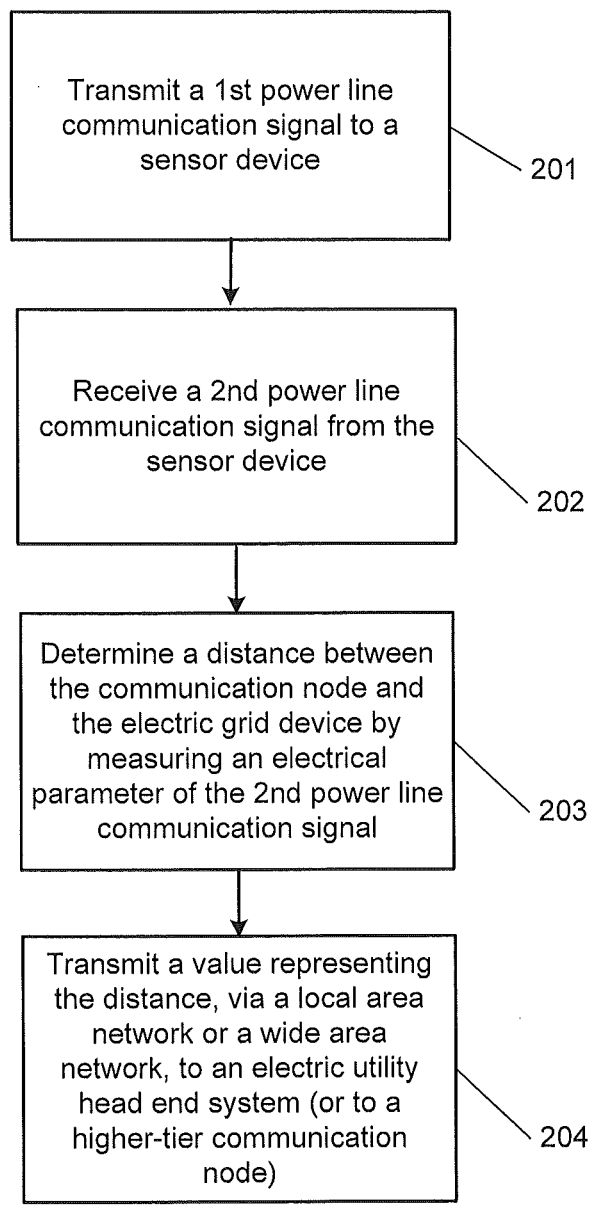

Referring to FIG. 2D, the operations of FIG. 2A may also include transmitting (Block 204), from the communication node C to an electric utility head end system H (or to a higher-tier communication node C), a value representing the distance D, via the communication network 115 (e.g., a local area network or a Wide Area Network). The communication node C may also transmit its own GPS location data to the electric utility head end system H. Accordingly, the electric utility head end system H may use the communication node C's GPS location data and the value representing the distance D to determine the position of the electric grid device E. For example, if the electric utility head end system H has GPS location data and values representing distances D from at least three communication nodes C, then the electric utility head end system H may triangulate the position of the electric grid device E.

Figure 2E:
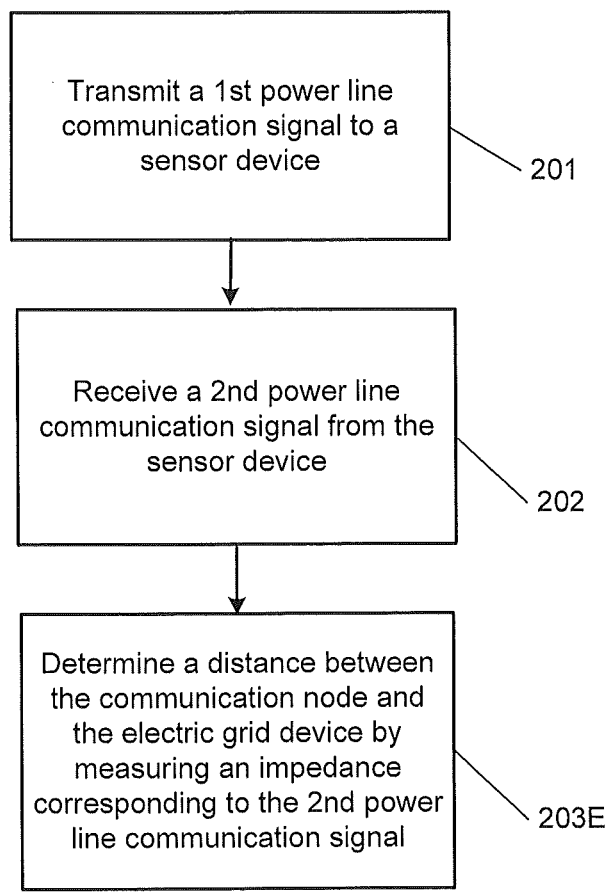

Referring to FIG. 2E, operations of determining (Block 203) the distance D between the communication node C and the electric grid device E by measuring the electrical parameter of second power line communication signal at the communication node may include determining (Block 203E) the distance D between the communication node C and the electric grid device E by measuring an impedance Z corresponding to the second power line communication signal, at the communication node C. For example, the impedance Z may be the impedance experienced by the second power line communication signal when traveling the distance D to the communication node C. Accordingly, the impedance Z may be determined at the communication node C in the field (i.e., closer to the electric grid device E) rather than at a more central location such as the electric utility data center 130 (or even a substation). Moreover, the measurement/determination of the impedance Z at the communication node C may be performed using a second PLC signal from the sensor device S that is responsive to a first PLC signal from the communication node C.

Figure 2F:
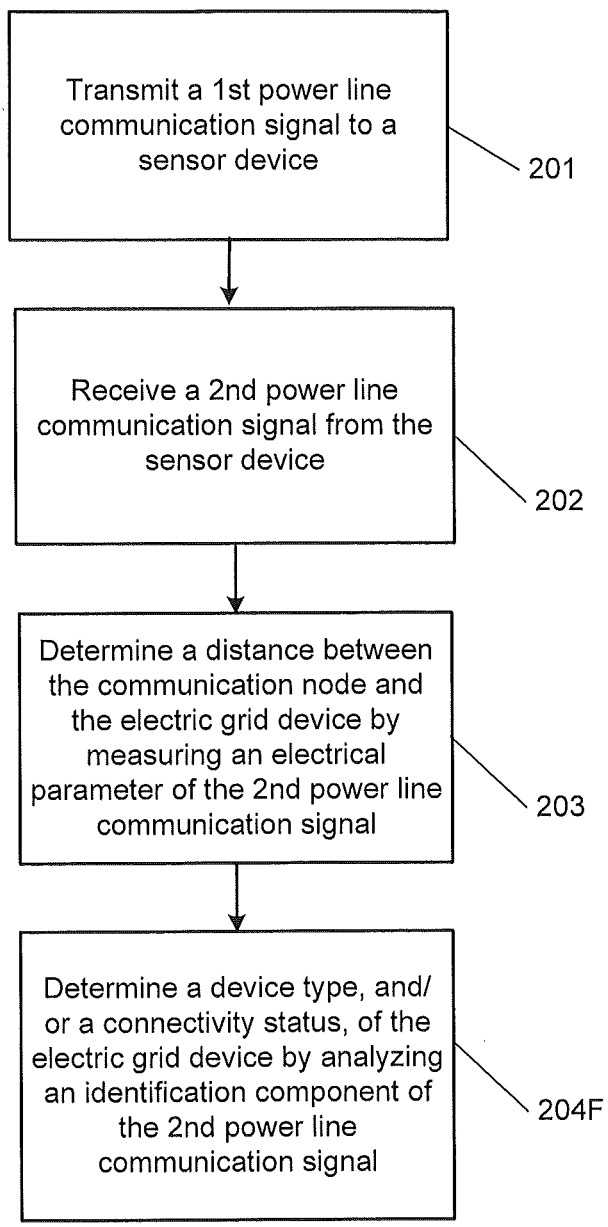

Referring to FIG. 2F, the operations of FIG. 2A may also include determining (Block 204F) a device type of the electric grid device E by analyzing an identification component (e.g., an identification signature) of the second power line communication signal, at the communication node C. An identification component may be, for example, a waveform or other electronic signature particular to a device's operation. As another non-limiting example, an identification component may be a pre-determined frequency tone/characteristic used to identify an asset/device. Accordingly, the communication node C may determine both a location and a device type of the electric grid device E using the second power line communication signal. Additionally or alternatively, the operations may include determining (Block 204F) whether the electric grid device E is electrically connected to an electric grid 100, by analyzing an identification component of the second power line communication signal, at the communication node C.

Figure 2G:
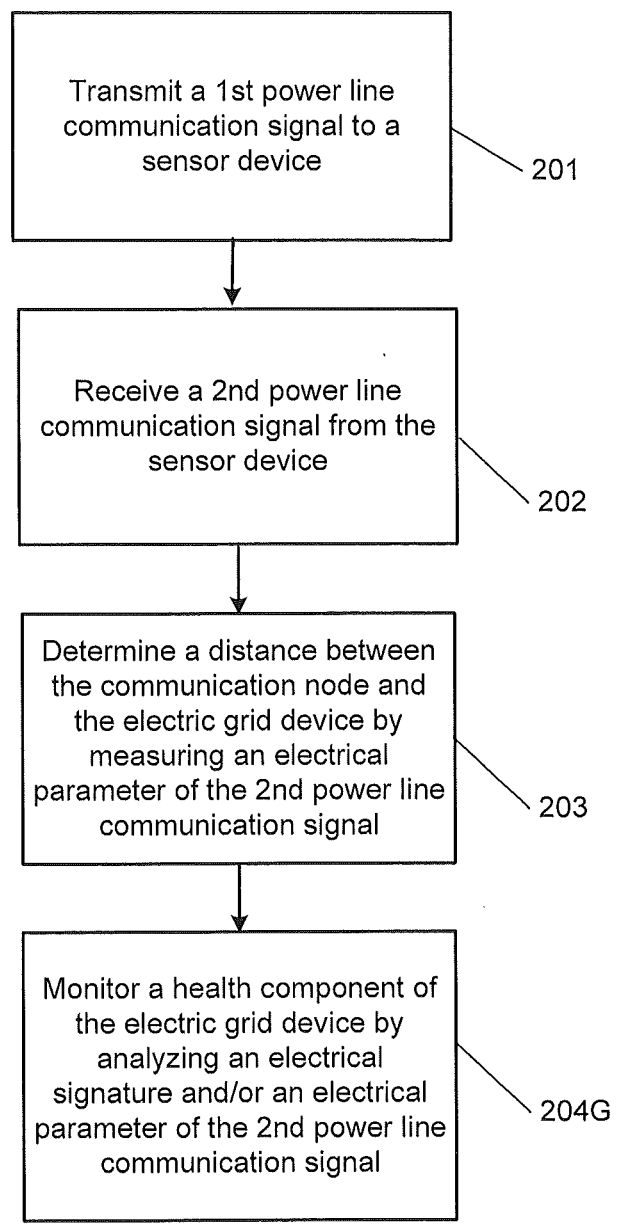

Referring to FIG. 2G, the operations of FIG. 2A may also include monitoring (Block 204G) a health component of the electric grid device E by analyzing an electrical signature (e.g., a health signature) and/or an electrical parameter of the second power line communication signal, at the communication node C. For example, the communication node C may perform waveform analysis of the second power line communication signal to determine asset health. As an example, the communication node C may perform waveform analysis to evaluate performance characteristics of the electric grid device E, behavioral characteristics of the electric grid device E, and/or indicators of aging of the electric grid device E.

Figure 2H:
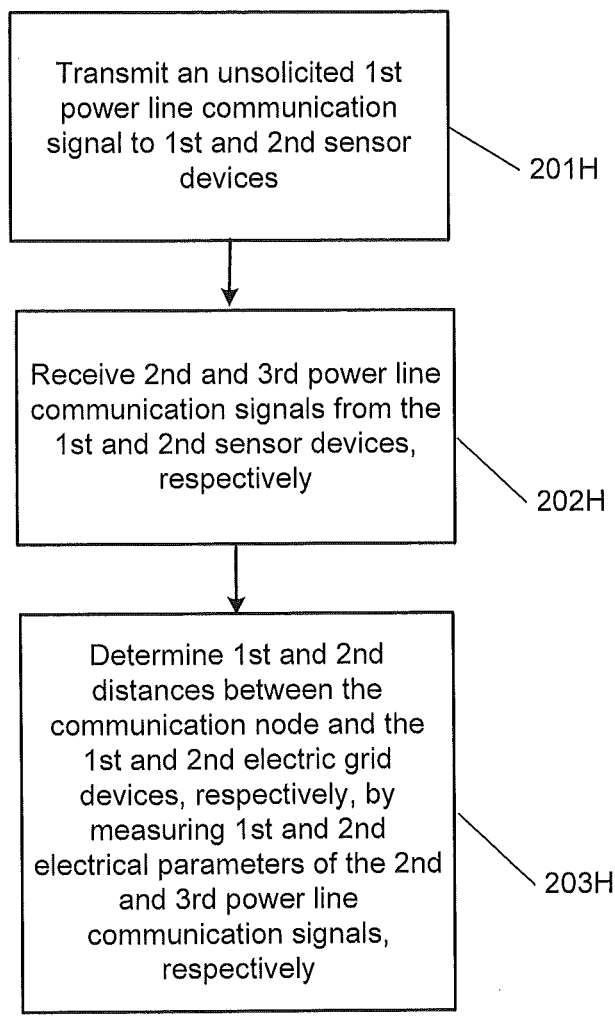

Referring to FIGS. 1A and 2H, it will be understood that transmitting (Block 201) the first power line communication signal P may include transmitting (Block 201H) an unsolicited ping P from the communication node C to a first sensor device $S_1$ that is at or adjacent a first electric grid device $E_1$ and to a second sensor device $S_2$ that is at or adjacent a second electric grid device $E_2$. In other words, the ping P may be transmitted from the communication node C to the first and second sensor devices $S_1$, $S_2$ without any requests/prompting by either of the first and second sensor devices $S_1$, $S_2$. Accordingly, in some embodiments, the communication node C may periodically transmit the unsolicited ping P after a pre-determined time interval, irrespective of whether the communication node C has received signals from the first and second sensor devices $S_1$, $S_2$. The unsolicited ping P may therefore be helpful in locating recently-added (or recently-relocated) electric grid devices E.

Moreover, referring still to FIG. 2H, the communication node C may receive (Block 202H) from the second sensor device $S_2$ a third power line communication signal that is responsive to the unsolicited ping P, in addition to receiving from the first sensor device $S_1$ the second power line communication signal (which is also responsive to the unsolicited ping P). Operations of the communication node C may also include determining (Block 203H) first and second distances $D_1$, $D_2$ between the communication node C and the first and second electric grid devices $E_1$, $E_2$, respectively, by measuring first and second electrical parameters of the second and third power line communication signals, respectively.

It will be understood that a communication node of FIG. 1C or 1E may be configured to perform the operations illustrated in FIGS. 2A-2H. For example, a power line communications interface 163 of the communication node C may be configured to perform the transmit and receive operations illustrated in FIGS. 2A-2H. Moreover, a processor 150 and/or a processor 150' of the communication node C may be configured to perform the measurements/determinations/analyses illustrated in FIGS. 2A-2H.

Figure 3A:
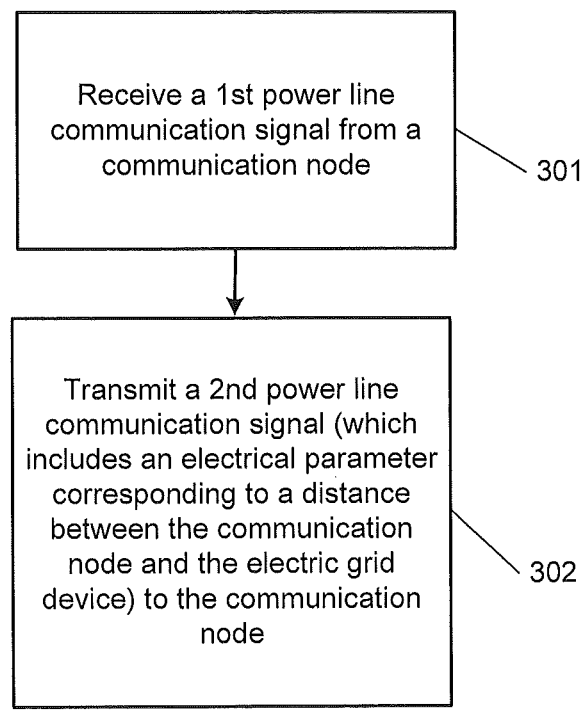
FIGS. 3A-3G are flowcharts illustrating operations of a sensor device of FIGS. 1A, 1B, and 1F, according to various embodiments.

Referring now to FIGS. 3A-3G, flowcharts are provided illustrating operations of a sensor device S of FIGS. 1A, 1B, and 1F, according to various embodiments. Referring to FIG. 3A, operations of a sensor device S that is at or adjacent an electric grid device E may include receiving (Block 301) from a communication node C a first power line communication signal P at the sensor device S that is at or adjacent the electric grid device E. Moreover, the operations may include transmitting (Block 302) a second power line communication signal from the sensor device S to the communication node C, in response to receiving the first power line communication signal P. The second power line communication signal may include an electrical parameter (e.g., characteristic) corresponding to a distance D between the communication node C and the electric grid device E.

Figure 3B:
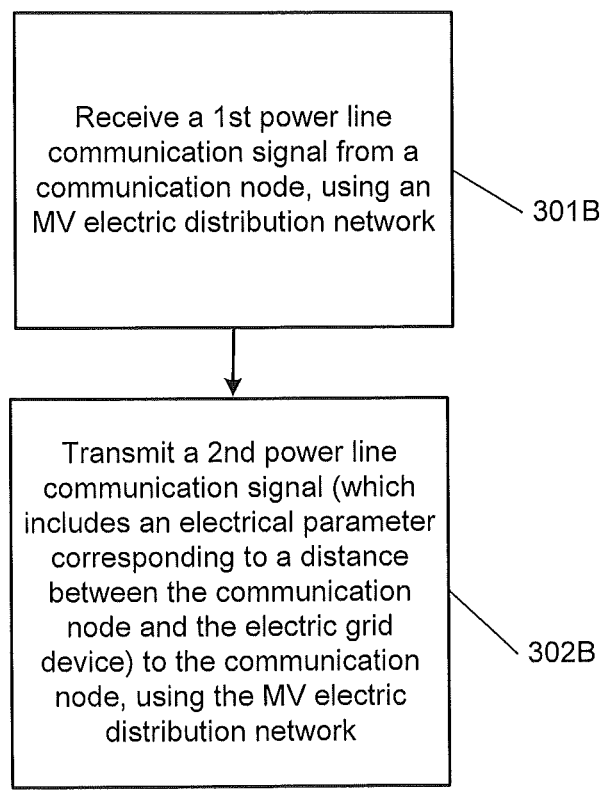

Referring to FIG. 3B, operations of receiving (Block 301) the first power line communication signal P may include receiving (Block 301B) the first power line communication signal P using a Mid Voltage (MV) electric distribution network corresponding to voltages between about 4,000 Volts and about 69,000 Volts. Moreover, operations of transmitting (Block 302) the second power line communication signal may include transmitting (Block 302B) the second power line communication signal using the Mid Voltage (MV) electric distribution network corresponding to voltages between about 4,000 Volts and about 69,000 Volts.

Figure 3C:
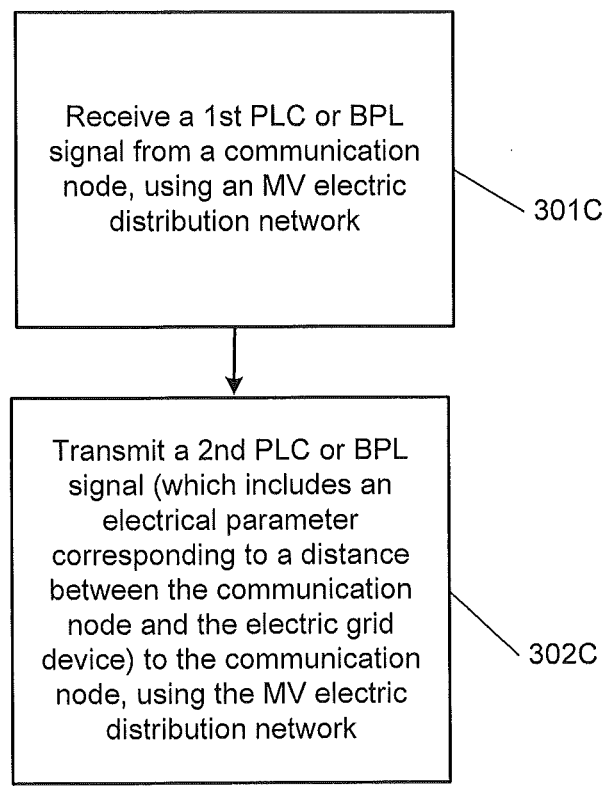

Referring to FIG. 3C, which is a modification of FIG. 3B, it will be understood that the first power line communication signal P may include a Power Line Carrier (PLC) signal or a Broadband over Power Lines (BPL) signal (Block 301C). Moreover, the second power line communication signal may also include a PLC signal or a BPL signal (Block 302C).

Figure 3D:
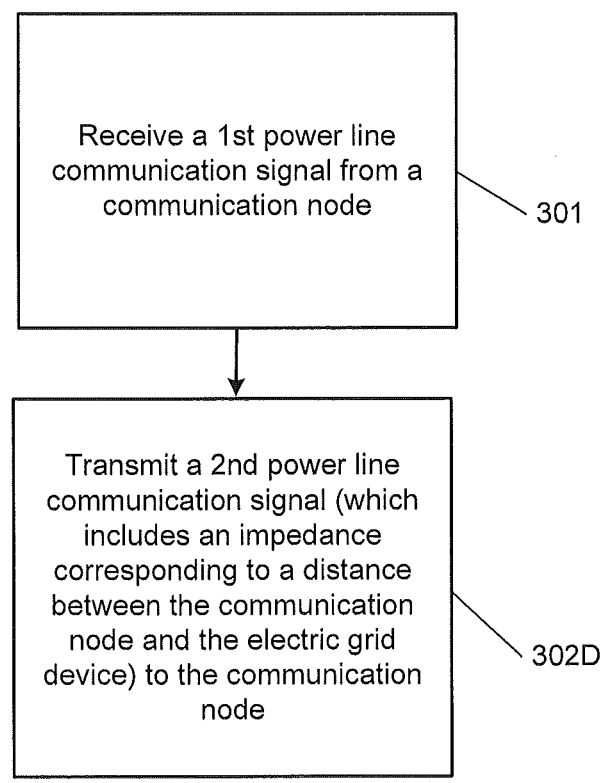

Referring to FIG. 3D, which is a modification of FIG. 3A, the electrical parameter (e.g., characteristic) corresponding to a distance D between the communication node C and the electric grid device E may be an impedance Z corresponding to the second power line communication signal (Block 302D).

Figure 3E:
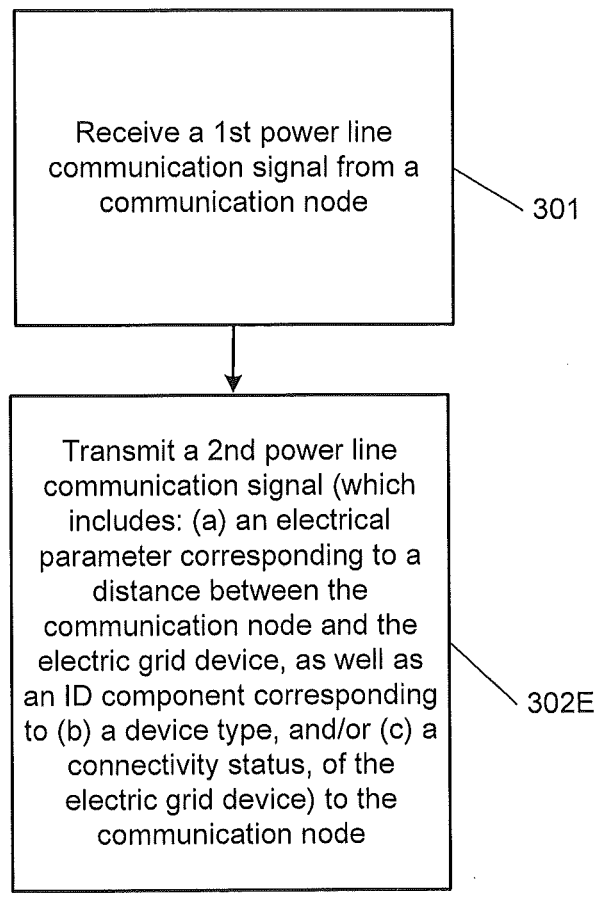

Referring to FIG. 3E, which is a modification of FIG. 3A, the second power line communication signal may include an identification component (e.g., an identification signature) corresponding to a device type of the electric grid device E, in some embodiments. Moreover, transmitting (Block 302) the second power line communication signal may include transmitting (Block 302E) the second power line communication signal including the identification component corresponding to the device type of the electric grid device E, from the sensor device S to the communication node C, in response to receiving the first power line communication signal P. In other words, the sensor device S may return a particular tone or answer based on the grid asset it is installed at/next to.

Additionally or alternatively, referring to still to FIG. 3E, the second power line communication signal may include an identification component corresponding to whether the electric grid device E is electrically connected to an electric grid 100. Moreover, transmitting (Block 302) the second power line communication signal may include transmitting (Block 302E) the second power line communication signal including the identification component corresponding to whether the electric grid device E is electrically connected to the electric grid 100, from the sensor device S to the communication node C, in response to receiving the first power line communication signal P.

Figure 3F:
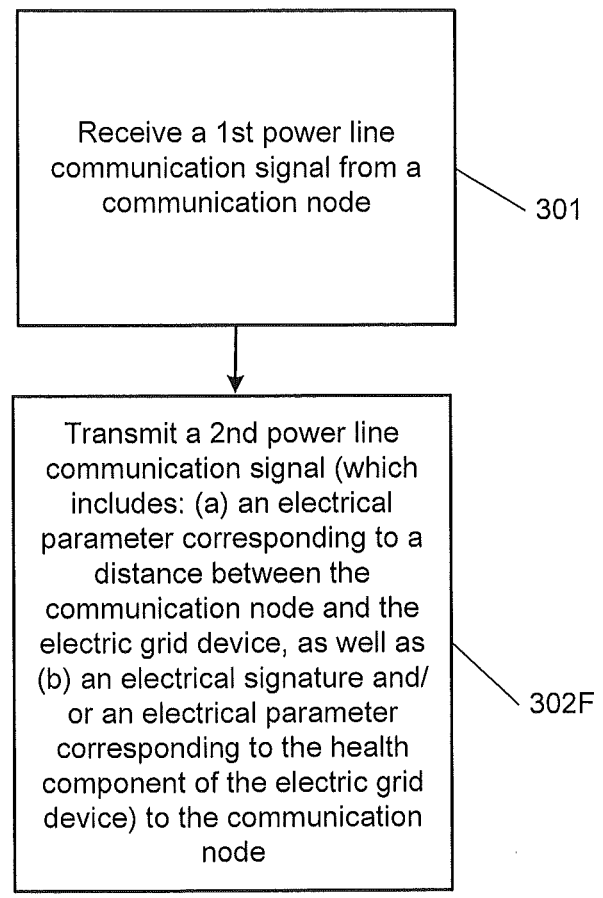

Referring to FIG. 3F, which is a modification of FIG. 3A, the second power line communication signal may include an electrical signature (e.g., health signature) and/or an electrical parameter corresponding to a health component of the electric grid device E. Moreover, transmitting (Block 302) the second power line communication signal may include transmitting (Block 302F) the second power line communication signal including the electrical signature and/or electrical parameter corresponding to the health component of the electric grid device E, from the sensor device S to the communication node C, in response to receiving the first power line communication signal P.

Figure 3G:
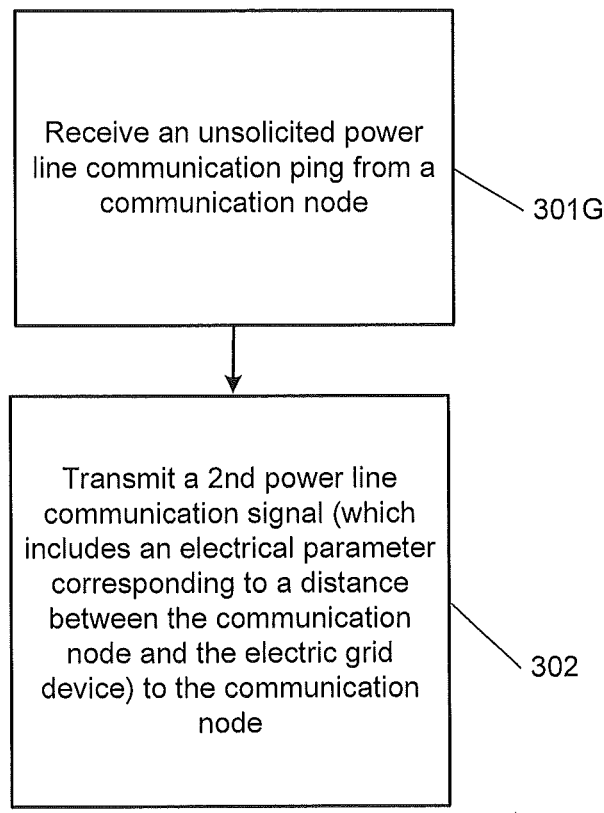

Referring to FIG. 3G, which is a modification of FIG. 3A, the first power line communication signal P may include an unsolicited ping P transmitted by the communication node C. Moreover, receiving (Block 301) the first power line communication signal P may include receiving (Block 301G) from the communication node C the unsolicited ping P at the sensor device S that is at or adjacent the electric grid device E.

It will be understood that a sensor device S of FIG. 1F may be configured to perform the operations illustrated in FIGS. 3A-3G. For example, a power line communications interface 163' of the sensor device S may be configured to perform the transmit and receive operations illustrated in FIGS. 3A-3G.

According to various embodiments described herein, a communication node C may send an MV PLC signal to a sonar sensor (e.g., a sensor device S). The communication node C may then analyze a responsive signal that it receives to determine, for example, (a) an impedance measurement, (b) a signature regarding device/asset (e.g., an electric grid device E) health, (c) a signature regarding a device/asset type, and/or (d) a signature regarding whether the device/asset is electrically connected to a grid. Because having a built-in GPS at the device/asset may be cost-prohibitive, the communication node C may perform the impedance measurement to determine a distance between the device/asset and the communication node C. Moreover, software of a head end system H may take (i) a GPS measurement of the communication node C and (ii) the impedance measurement by the communication node C to determine GIS coordinates for the device/asset. Accordingly, PLC and waveform analysis tools can be used at the communication node C to help determine the geospatial relationship of grid devices/assets and/or to monitor and improve grid device/asset health. In contrast, analysis/calculations performed exclusively at the electric utility data center 130, without using the communication node C that is in the field and thus closer to the grid device/asset, may be slower and less accurate.

In the specification, various embodiments of the present inventive concepts have been disclosed and, although specific terms are employed, they are used in a generic and descriptive sense only and not for purposes of limitation. Those skilled in the art will readily appreciate that many modifications are possible for the disclosed embodiments without materially departing from the teachings and advantages of the present inventive concepts. The present inventive concepts are defined by the following claims, with equivalents of the claims to be included therein.

What is claimed is:

1. A method of operating a communication node, the method comprising:
   transmitting, using a Mid Voltage (MV) electric distribution network corresponding to voltages between about 4,000 Volts and about 69,000 Volts, a first power line communication signal from the communication node to a sensor device that is at or adjacent an electric grid device;
   receiving, using the Mid Voltage (MV) electric distribution network corresponding to voltages between about 4,000 Volts and about 69,000 Volts, from the sensor device a second power line communication signal that is responsive to the first power line communication signal, at the communication node;
   determining a distance between the communication node and the electric grid device by measuring an electrical parameter of the second power line communication signal, at the communication node; and
   transmitting, from the communication node to an electric utility head end system, a value representing the distance, via a local area network or a wide area network,
   wherein the electric utility head end system determines coordinates for the electric grid device by using (i) a GPS measurement of the communication node and (ii) the value representing the distance between the communication node and the electric grid device, and
   wherein the electric grid device is on a distribution line.

2. The method of claim 1, wherein the first power line communication signal comprises a Power Line Carrier (PLC) signal or a Broadband over Power Lines (BPL) signal.

3. The method of claim 1, wherein determining the distance between the communication node and the electric grid device by measuring the electrical parameter of second power line communication signal at the communication node comprises:
   determining the distance between the communication node and the electric grid device by measuring an impedance corresponding to the second power line communication signal, at the communication node.

4. The method of claim 1, further comprising determining whether the electric grid device is electrically connected to an electric grid, by analyzing an identification component of the second power line communication signal, at the communication node.

5. The method of claim 1, further comprising monitoring a health component of the electric grid device by analyzing an electrical signature and/or an electrical parameter of the second power line communication signal, at the communication node.

6. The method of claim 1, wherein:
   the sensor device comprises a first sensor device;
   the electric grid device comprises a first electric grid device;
   transmitting the first power line communication signal comprises transmitting an unsolicited ping from the communication node to the first sensor device and to a second sensor device that is at or adjacent a second electric grid device;
   the distance comprises a first distance;
   the electrical parameter comprises a first electrical parameter; and
   the method further comprises:
      receiving from the second sensor device a third power line communication signal that is responsive to the unsolicited ping, at the communication node; and
      determining a second distance between the communication node and the second electric grid device by measuring a second electrical parameter of the third power line communication signal, at the communication node.

7. The method of claim 1, further comprising determining a device type of the electric grid device by analyzing an identification component of the second power line communication signal, at the communication node.

8. The method of claim 7, wherein the identification component of the second power line communication signal comprises a waveform or other electronic signature particular to an operation of the electric grid device.

9. A communication node, comprising:
   a power line communications interface configured to:
      transmit, using a Mid Voltage (MV) electric distribution network corresponding to voltages between about 4,000 Volts and about 69,000 Volts, a first power line communication signal from the communication node to a sensor device that is at or adjacent an electric grid device; and
      receive, using the Mid Voltage (MV) electric distribution network corresponding to voltages between about 4,000 Volts and about 69,000 Volts, from the sensor device a second power line communication signal that is responsive to the first power line communication signal;
   a processor, wherein the processor is configured to determine a distance between the communication node and the electric grid device by measuring an electrical parameter of the second power line communication signal at the communication node; and
   a network interface configured to transmit, from the communication node to an electric utility head end system, a value representing the distance, via a local area network or a wide area network,
   wherein the electric utility head end system determines coordinates for the electric grid device by using (i) a GPS measurement of the communication node and (ii) the value representing the distance between the communication node and the electric grid device, and
   wherein the electric grid device comprises a field asset on a distribution line.

10. The communication node of claim 9, further comprising a polling device that comprises at least one of the power line communications interface and the processor.

11. The communication node of claim 9, wherein the first power line communication signal comprises a Power Line Carrier (PLC) signal or a Broadband over Power Lines (BPL) signal.

12. The communication node of claim 9, wherein:
   the electrical parameter comprises an impedance; and
   the processor is configured to determine the distance between the communication node and the electric grid device by using the impedance of the second power line communication signal.

13. The communication node of claim 9, wherein an identification component of the second power line communication signal comprises a waveform or other electronic signature particular to an operation of the electric grid device.

14. The communication node of claim 9, wherein the processor is further configured to determine whether the electric grid device is electrically connected to an electric grid, by analyzing an identification component of the second power line communication signal.

15. The communication node of claim 9, wherein the processor is further configured to monitor a health component of the electric grid device by analyzing an electrical signature and/or an electrical parameter of the second power line communication signal.

16. The communication node of claim 9, wherein:
the sensor device comprises a first sensor device;
the electric grid device comprises a first electric grid device; and
the power line communications interface is configured to transmit the first power line communication signal as an unsolicited ping to the first sensor device and to a second sensor device that is at or adjacent a second electric grid device;
the distance comprises a first distance;
the electrical parameter comprises a first electrical parameter;
the power line communications interface is configured to receive from the second sensor device a third power line communication signal that is responsive to the unsolicited ping; and
the processor is configured to determine a second distance between the communication node and the second electric grid device by measuring a second electrical parameter of the third power line communication signal.

17. The communication node of claim 9, wherein the field asset comprises a capacitor bank, regulator, recloser, line switch, fuse, street light, or transformer on the distribution line.

18. A method of operating a communication node located in a field of a power grid of an electric utility, the method comprising:
transmitting a first power line communication signal from the communication node in the field to a sensor device that is at or adjacent a field asset on a distribution line of the power grid;
receiving from the sensor device a second power line communication signal that is responsive to the first power line communication signal, at the communication node in the field;
determining a distance between the communication node in the field and the field asset that is on the distribution line by measuring an electrical parameter of the second power line communication signal, at the communication node in the field; and
transmitting, from the communication node to an electric utility head end system, a value representing the distance, via a local area network or a wide area network,
wherein the electric utility head end system determines coordinates for the field asset by using (i) a GPS measurement of the communication node and (ii) the value representing the distance between the communication node and the field asset.

* * * * *